United States Patent Office 3,310,469
Patented Mar. 21, 1967

3,310,469
PHARMACEUTICAL COMPOSITIONS AND METHODS UTILIZING 1-AMINOADAMANTANE AND ITS DERIVATIVES
Marvin Paulshock and John C. Watts, Wilmington, Del., assignors to E. I. du Pont de Nemours and Company, Wilmington, Del., a corporation of Delaware
No Drawing. Filed May 5, 1966, Ser. No. 547,752
30 Claims. (Cl. 167—65)

This application is a continuation-in-part of copending application Ser. No. 318,073 filed Oct. 22, 1963, now abandoned, which in turn is a continuation-in-part of application Ser. No. 272,833 filed April 15, 1963, now abandoned, which in turn is a continuation-in-part of application Ser. No. 134,157 filed Aug. 28, 1961, now abandoned.

This invention relates to chemical derivatives of adamantane and to processes and compositions utilizing such derivatives.

The disclosure herein should not be taken as a recommendation to use the disclosed invention in any way without full compliance with U.S. Food and Drug laws and other laws and governmental regulations which may be applicable.

According to the present invention, a class of adamantane derivatives is discovered to have extremely valuable pharmaceutical applications. The class of compounds of this invention is characterized by particular effectiveness in preventing virus attacks and in treating virus infections and related conditions inimical to the well being of the body.

The adamantane derivatives within the scope of the present invention are represented by the following formula:

(1)
$$\text{adamantane structure with } C-A \text{ substituent}$$

where A is an amine, an alkylidene amine or a cyclic amine group selected from one of the following four groups (Formulas 2 through 5 inclusive):

A in Formula 1 can be an amine group of the following structure:

(2)
$$-N\begin{matrix}R_1\\R_2\end{matrix}$$

where $R_1$ and $R_2$ can be the same or different and are selected from the group consisting of hydrogen; alkyl of 1 through 4 carbons; mono-substituted alkyl of less than 5 carbons where the substituent is hydroxy, alkoxy of less than 4 carbons, amino, alkylamino of less than 3 carbons, dialkylamino where each alkyl has less than 3 carbons, or hydroxyalkoxyalkyl where the alkoxy portion has less than 4 carbons and the alkyl portion has less than 5 carbons; alkenyl of 3 through 6 carbons, having at least one methylene group between the nitrogen atom of said amine group and the first unsaturation of said alkenyl group; and alkynyl of 3 through 6 carbons, having at least one methylene group between the nitrogen atom of said amine group and the first unsaturation of said alkynyl group; $R_2$ can also be formyl, chlorine, bromine, chloroalkyl of less than 5 carbons, carboxymethyl, methoxycarbonylmethyl or ethoxycarbonylmethyl; with $-NR_1R_2$ having a maximum total of 12 carbons in the above substituents.

In the alternative A in Formula 1 can be an alkylidene amine group of the following structure:

(3)
$$-N=C\begin{matrix}R_3\\R_4\end{matrix}$$

where $R_3$ is hydrogen, alkyl of 1 through 4 carbons, or phenyl; and $R_4$ is hydrogen or alkyl of 1 through 4 carbons;

In the alternative A in Formula 1 can be a cyclic amine group having the structure of the following Formulas 4 or 5:

(4)
$$-N\overbrace{(CH_2)_n}$$

where $n$ is an integer of 2 through 6; and preferably 4 or 5;

(5)
$$-N\begin{matrix}CH_2-CH_2\\CH_2-CH_2\end{matrix}O$$

It will be understood that the compounds of Formula 1, since they contain a basic amine group, form salts with non-toxic acids and such salts are included within the scope of this invention. These salts enhance the pharmaceutical application of the compounds. Representative of such salts are the hydrochloride, hydrobromide, sulfate, phosphate, acetate, lactate, succinate, propionate, pamoate, tartrate, salicylate, citrate and bicarbonate. Of these the hydrochloride and acetate are preferred. Other salts include those with caprochlorone and with penicillin.

From the above descriptions, it can be seen that this invention in a broad embodiment embraces 1-aminoadamantane and 1-(substituted-amino)adamantanes. Mixtures of compounds are of course contemplated, whether obtained as such in synthesis or specifically admixed after preparation.

It will also be readily understood that the concept of the present invention cannot be avoided by the use of compounds which hydrolyze to a compound of Formula 1 or which readily metabolize in the animal organs to a compound of Formula 1. Such compounds are of course contemplated as within the scope of the present invention and illustrations of such compounds are given below.

The above compounds can be prepared by a variety of methods.

1-aminoadamantane can be prepared by high temperature hydrolysis of 1-acetamidoadamantane, which in turn is conveniently prepared from 1-bromoadamantane, acetonitrile and sulfuric acid. A specific illustration of the preparation is as follows:

EXAMPLE 1

A solution of 100 parts by weight of 1-bromoadamantane and 750 parts by weight of acetonitrile is stirred while about 270 parts by weight of concentrated sulfuric acid is added dropwise over a 2½ hour period. The resulting mixture is poured into 2500 parts by weight of cold water. The resulting precipitate is removed by filtration, washed with water and air dried to give essentially pure 1-acetamidoadamantane. This latter adamantane compound in an amount of 72 parts by weight, 150 parts by weight of pulverized sodium hydroxide, and 1500 parts by weight of diethylene glycol are heated together at 180° C. for about 5 hours. The mixture is cooled and poured into 3600 parts by weight of cold water. The amine is isolated by ether extraction and subsequent removal of ether to give essentially pure 1-aminoadamantane.

This latter compound is significantly distinctive in activity and is therefore particularly preferred, having remarkable broad antiviral effectiveness, as illustrated in the form of its hydrochloride salt by activity against influenza A (strains PR8, swine, WS, WSN, FM-1), influenza A-2 (strains Jap 305, JPC, Michigan A/AA), influenza C (strain 1233), and pseudorabies (Aujesky strain). Other compounds of Formula 1 have shown activity against vaccina, influenza B (Lee/40), pox viruses and arboviruses, in addition to activity against the influenza strains listed above. Both prophylactic and therapeutic effects have been noted.

The preparation of the salts of 1-aminoadamantane can be carried out by dissolving the 1-aminoadamantane in water or other suitable solvent containing 1 or more equivalents of an acid. For example, 1-aminoadamantane is stirred into a small amount of water and an equivalent molar quantity of concentrated hydrochloric acid is added. The resulting material can be concentrated in vacuo at moderate temperatures to yield 1-aminoadamantane hydrochloride as a solid.

Other exemplary salts of 1-aminoadamantane can be prepared according to the following illustrative procedures:

EXAMPLE 1-A

A solution of 20 grams of 1-aminoadamantane in 250 milliliters of ether is shaken with 5 milliliters of water in a separatory funnel, and the ether layer is separated. This is saturated with carbon dioxide gas until no more precipitation occurs. The precipitate is filtered, washed with ether and air-dried. The yield is 21.3 grams of 1-aminoadamantane bicarbonate as a powdery, colorless solid.

This compound shows activity against influenza A (swine and WSN), and influenza A-2 (Jap 305, JPC and Michigan A/AA).

EXAMPLE 1-B

A solution of 9.39 grams (0.05 mole) of 1-aminoadamantane hydrochloride in 50 milliliters of water is added to a solution of 10.81 grams (0.025 mole) of pamoic acid, 4,4'-methylenebis-(3-hydroxy-2-naphthoic acid), disodium salt, in 150 milliliters of water. The solid which separates is filtered, washed well with water, and then extracted with 6 liters of boiling water. The extract is allowed to cool, the crystals are filtered, and then washed with water and dried in a vacuum at 80° C. The yield of 1-aminoadamantane pamoate crystals is 5.60 grams.

Anal. Calc'd for $C_{43}H_{50}O_6N_2$: N, 4.06. Found: N, 3.87.

This compound shows activity in vitro against influenza A (WSN) and influenza A-2 (JPC and Michigan A/AA) and in vivo against influenza A (swine), and influenza A-2 (Michigan A/AA).

EXAMPLE 1-C

A solution of 7.56 grams (0.05 mole) of 1-aminoadamantane in 100 milliliters of ether is added to a solution of 16.52 grams (0.05 mole) of L-4-(o-chlorobenzyl)-5-oxo-4-phenylhexanoic acid (caprochlorone) in 150 milliliters of ether. A precipitate separates, which is filtered, washed with ether and air-dried. The yield of 1-aminoadamantane, salt with caprochlorone, a finely-divided, colorless, crystalline solid, is 21.37 grams. Its melting point is 198.8–199.8° C.

Anal. Calc'd for $C_{29}H_{36}ClO_3N$: C, 72.25; H, 7.53; N, 2.91. Found: C, 72.66; H, 7.69; N, 2.92.

This compound shows activity against New Castle disease (Bonnie), pseudorabies, WSN, JPC, and Michigan A/AA influenzas.

EXAMPLE 1-D

A mixture of 0.1 mole of 1-aminoadamantane and 0.1 mole of 1-(1-adamantyl)-3-p-tolylsulfonyl urea is taken up in 1000 milliliters of boiling absolute alcohol, and allowed to cool. The crystalline product, which is 1-aminoadamantane, salt with 1-(1-adamantyl)-3-p-tolylsulfonyl urea, is filtered and dried.

By way of further illustration, for example, 1-(methylamino)adamantane is dissolved in ethyl alcohol and an alcoholic solution of one molar equivalent of acetic acid is added. The resulting 1-(methylamino)adamantane acetate can be isolated by concentration of the solution in vacuo at moderate temperatures.

Specific examples of various salts that can be prepared using the appropriate acid by conventional techniques such as described above include the following:

1-aminoadamantane hydrochloride
1-aminoadamantane phosphate
1-aminoadamantane sulfate
1-aminoadamantane adipate
1-aminoadamantane acetate
1-aminoadamantane succinate
1-aminoadamantane propionate
1-aminoadamantane salicylate
1-aminoadamantane tartrate
1-aminoadamantane citrate
1-aminoadamantane lactate
1-aminoadamantane, salt with penicillin
1-dimethylaminoadamantane, salt with caprochlorone
1-(dimethylamino)adamantane hydrochloride
1-(methylamino)adamantane succinate
1-(diethylamino)adamantane citrate
1-(3-dimethylaminopropylamino)adamantane acetate
1-(2-dimethylaminoethylamino)adamantane hydrochloride
1-(2-hydroxyethylamino)adamantane propionate
1-(hydroxyethoxyethylamino)adamantane sulfate
1-(3-hydroxypropylamino)adamantane bicarbonate
1-(3-dimethylaminopropylamino)adamantane diacetate
1-(2-chloroethylamino)adamantane hydrochloride
1-(4-methoxybutylamino)adamantane acetate Salts as described above are also useful as modifiers for electroplating baths.

These compounds of Formula 1 wherein "A" is other than —NH$_2$ constitute a particular class of compounds of unexpectedly desirable characteristics. For example, favorable toxicity advantages, particularly at relatively high dosages, place these compounds in a class by themselves. Absorption rates, handling characteristics, stability and compatibility with pharmaceutical adjuvants are also improved in many of these compounds.

This last mentioned class of compounds is represented by the formula:

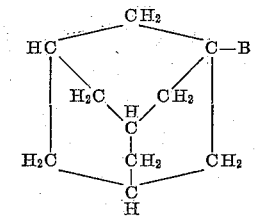

where B is a substituted amine, an alkylidene amine group as defined in Formula 3 above, or a cyclic amine group as defined in Formulas 4 and 5 above. Where B is a substituted amine group it has the following structure:

(7)

where $R_1$ has the same meaning as above and Z is selected from the group consisting of alkyl of 1 through 4 carbons; mono-substituted alkyl of less than 5 carbons where the substituent is chlorine, hydroxy, alkoxy of less than 4 carbons, amino, alkylamino of less than 3 carbons, dialkylamino where each alkyl has less than 3 carbons, or hydroxyalkoxyalkyl where the alkoxy portion has less than 4 carbons and the alkyl portion has less than 5 carbons; alkenyl of 3 through 6 carbons, having at least one methylene group between the nitrogen atom of said amine group and the first unsaturation of said alkenyl group; alkynyl of 3 through 6 carbons, having at least one methylene group between the nitrogen atom of said amine group and the first unsaturation of said alkynyl group; chlorine; bromine; carboxymethyl; methoxycarbonylmethyl; and ethoxycarbonylmethyl; with —NR$_1$Z having a maximum total of 12 carbons in the above substituents.

This latter class of compounds of Formula 6 is different from 1-aminoadamantane in that the compounds of Formula 6 have lower volatility and lower melting points, rendering them particularly useful for purposes where such characteristics are desired. Thus, the vapor pressure of this class of compounds is signficantly better for use in such applications as nasal treatments, including spray and vapor treatment.

The compounds of Formula 6 are also useful as antioxidants.

Those compounds of Formula 6 having either or both hydroxyl or alkoxyl substituents are found to be particularly useful because of outstanding increased hydrophilic properties.

Surprisingly, in tests in vitro and in vivo so far, the compound of Formula 1 where "A" is —NH$_2$ has not shown activity against influenza B strains. For some reason not understood at the present time, other compounds within the scope of this invention have shown significant broad spectrum activity against both influenza A and B strains. The dialkylamino compounds are especially notable in this regard and for this reason the dialkylamino compounds and in particular 1-(dimethylamino)adamantane, 1-(N-ethyl-N-methylamino)adamantane, 1-(diethylamino)adamantane, 1 - (di - n - propylamino)adamantane and 1-(diisopropylamino) adamantane and their salts are particularly preferred.

This class of compounds exhibits excellent activity and remarkable absence of undesired side effects as evidenced by tests to date. The monoalkylamino compounds such as 1-(ethylamino)adamantane likewise provide significant advantages in these respects.

While the foregoing advantages of the unsubstituted amino compound, the unsubstituted monoalkylamino compounds, and the unsubstituted dialkylamino compounds make them preferred, other compounds of this invention provide particularly useful combinations of properties under certain circumstances. For example, the substituted alkylamino and substituted dialkylamino compounds offer formulating benefits such as increased water-solubility as shown by the hydroxy and alkoxy substituted compounds.

The alkylideneamino, the N-haloamino and especially the formamido compounds are extremely unusual in specificity and type of activity. For example, 1-formamidoadamantane is highly active against Semliki forest virus but appears to be in a class by itself since only weakly active on some viruses against which other compounds of Formula 1 are highly active.

Particularly preferred compounds within this invention because of their outstanding combination of properties are the salts, and especially the hydrochloride and acetate, of the following compounds:

1-aminoadamantane
1-(methylamino)adamantane
1-(ethylamino)adamantane
1-(dimethylamino)adamantane
1-(diethylamino)adamantane
1-(formamidoadamantane Compounds of Formulas 1 and 6 wherein the amino group has alkyl, alkenyl or alkynnyl substituents can be prepared in a suitable solvent from 1-aminoadamantane and an alkyl, alkenyl or alkynyl halide followed by neutralization of the resulting hydrogen halide salt of the alkylated, alkenylated or alkynylated aminoadamantane. Specific illustrations of this are as follows:

EXAMPLE 2

Equimolar amounts of 1-aminoadamantane and methyl iodide are mixed in about one liter of xylene and held overnight. The solid product is then stirred in 500 cc. of water containing an equimolar amount of sodium hydroxide. The product is recovered by extraction with ether and found to be an approximately 1:3 mixture of 1-(methylamino)adamantane and unreacted 1-aminoadamantane, from which the 1-(methylamino)adamantane can be isolated by preparative vapor phase chromatography.

EXAMPLE 2-A

A 2-liter 4-necked round-bottom flask is equipped with thermometer, dropping funnel, reflux condenser, paddle stirrer and a connection to a gas meter. The flask is charged with 500 milliliters of absolute ethanol, 50.4 grams (0.60 mole) of sodium bicarbonate and 37.5 grams (0.20 mole) of 1-aminoadamantane hydrochloride. Then 24.2 grams (0.20 mole) of allyl bromide is added from the dropping funnel. There is no appreciable evolution of carbon dioxide. The mixture is gradually warmed to 65° C., whereupon gas evolution begins. The reaction is allowed to proceed until no more gas is evolved (about 1.5 liters). The mixture is cooled, the solids are filtered, and the filtrate is evaporated. The residue is distributed between ether and 10% sodium hydroxide solution. The ether layer is dried with anhydrous potassium carbonate and evaporated to give 34 grams of an oil. Distillation gives 14.6 grams (38%) of an oil, B.P. 55–58° C. at 0.10 mm. This oil gives a single peak on gas chromatography. The infrared spectrum shows a band at 6.09 microns attributable to —CH=CH—. The $n_D{}^{25}$ is 1.5120.

*Analysis.*—Calc'd for $C_{13}H_{21}N$: C, 81.61; H, 11.06. Found: C, 81.27; H, 10.73.

This product is identified as 1-(allylamino)adamantane. This is converted to the hydrochloride salt, M.P. 325–328° C. The distillation is continued, and a higher boiling fraction, B.P. 78° C. (0.05 mm.) is obtained, weight 3.87 grams (8%), $n_D{}^{25}$ is 1.5185.

*Analysis.*—Calc'd for $C_{16}H_{25}N$: C, 83.05; H, 10.89. Found: C, 83.18; H, 10.92.

This product is identified as 1-(diallylamino)adamantane. This is converted to the hydrochloride salt, which sublimes about 385° C.

EXAMPLE 2-B

A reaction is run as described in Example 2-A using 37.5 grams (0.20 mole) of 1-aminoadamantane hydrochloride, 16.4 grams (0.20 mole) of propargyl chloride, 50.4 grams (0.60 mole) of sodium bicarbonate and 500 milliliters of alcohol. The product is filtered to remove insoluble material and the filtrate is evaporated. The residue is distributed between 10% NaOH solution and ether. The ether layer is dried with anhydrous potassium carbonate and evaporated. The residue is dissolved in a mixture of 300 milliliters of alcohol and 30 milliliters of water. Carbon dioxide is passed in for about 3 hours to precipitate unchanged 1-aminoadamantane. The mixture is filtered and the filtrate is evaporated. The residue is distilled to give 11.9 grams of a colorless liquid, 1-(propargylamino)-adamantane, B.P. 150–153° C./22 mm.; $n_D{}^{25}$ is 1.5245. It turns pink on standing.

*Analysis.*—Calc'd for $C_{13}H_{19}N$: C, 82.48; H, 10.12; N, 7.40. Found: C, 82.98; H, 10.53; N, 7.38. Its hydrochloride salt melts at 264–266° C.

Another fraction, B.P. 144–148° C./23 mm., is taken, and found to be 1-(dipropargylamino)adamantane.

Following the foregoing procedures, other compounds of Formulas 1 and 6 can be prepared using the following indicated reactant to obtain the indicated products. In each of the following listed Examples 3–12 equimolar parts of 1-aminoadamantane and the indicated reactant are brought together under the conditions described above, followed by recovery of the indicated products.

| Ex. No. | Reactant | Products |
|---|---|---|
| 3 | Ethyl iodide | 1-(ethylamino)adamantane. 1-(diethylamino)adamantane. |
| 4 | Butyl bromide | 1-(butylamino)adamantane. 1-(dibutylamino)adamantane. |
| 5 | sec-Butyl bromide | 1-(sec-butylamino)adamantane. 1-(di-sec-butylamino)adamantane. |
| 6 | 3-dimethylaminopropyl bromide. | 1-(3-dimethylaminopropylamino)adamantane. 1-[di-(3-dimethylaminopropyl)amino]adamantane. |
| 7 | 2-dimethylaminoethyl bromide. | 1-(2-dimethylaminoethylamino)adamantane. 1-[di-(2-dimethylaminoethyl)amino]adamantane. |
| 8 | 4-dimethylaminobutyl bromide. | 1-(4-dimethylaminobutylamino)adamantane. 1-[di-(4-dimethylaminobutyl)amino]adamantane. |
| 9 | 2-chloroethanol | 1-(2-hydroxyethylamino)adamantane. 1-[di-(2-hydroxyethyl)amino]adamantane. |
| 10 | Isopropyl bromide | 1-(isopropylamino)adamantane. 1-(diisopropylamino)adamantane. |
| 11 | 2-hydroxyethoxyethyl chloride. | 1-(2-hydroxyethoxyethylamino)adamantane. 1-[di-(2-hydroxyethoxyethyl)amino]adamantane. |
| 12 | 3-methoxypropyl bromide. | 1-(3-methoxypropylamino)adamantane. 1-[di-(3-methoxypropyl)amino]adamantane. |

In the alternative process, 1-N-alkylaminoadamantanes of this invention can be prepared by a generally useful two-step process which involves in the first step the preparation of 1-N-alkylacetamidoadamantane from either 1-bromoadamantane or a 1-(dialkylamino)adamantane oxide, followed in the second step by the conversion of the 1-N-alkylacetaminoadamantane to the desired 1-(alkylamino)adamantane by the use of caustic at elevated temperature. This procedure starting from the 1-bromoadamantane is illustrated by the following equations wherein the adamantane moiety is for convenience represented by "Ad":

Step 1

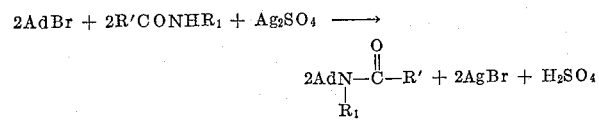

Step 2

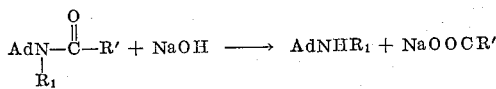

A specific illustration of this procedure is given in the following example by way of further explanation:

EXAMPLE 13

A 500-milliliter flask equipped with a paddle-stirrer and drying tube is charged with 102 grams (1.40 moles) of N-methylacetamide, 86 grams (0.386 mole) of 1-bromoadamantane and 121 grams (0.388 mole) of silver sulfate. (Yields are improved when the reaction mass is free of water and acetic acid.) The reaction mixture is heated in an oil bath at 100° C. for 1 hour. The product is poured into 100 milliliters of cold water. The mixture is extracted with ether which is dried with magnesium sulfate and evaporated. The residue is crystallized from hexane to give 34.2 grams (43%) of 1-N-methylacetamidoadamantane, M.P. 122.123° C.

A 250-milliliter flask equipped with a magnetic stirrer and reflux condenser is charged with 15.5 grams (0.060 mole) of 1-N-methylacetamidoadamantane, 12.0 grams (0.30 mole) of sodium hydroxide and 120 milliliters of diethylene glycol. This mixture is refluxed for 5 hours. The cooled product is poured into 900 milliliters of water. Extraction with ether, drying with anhydrous potassium carbonate, and evaporation of the ether gives 13.0 grams of crude 1-(methylamino)adamantane. The infrared spectrum of this material shows no amide band.

Following the procedures of Example 13, other compounds of this invention are readily prepared using the following indicated reactant to obtain the indicated products. In each of the following listed Examples 14 through 18 1-bromoadamantane and the indicated reactant, in amounts corresponding by weight to that of the reactants of Example 13, are brought together with silver sulfate under the conditions of that example, followed by treatment with sodium hydroxide and recovery of the indicated product.

| Example No. | N-substituted acetamide reactant | Final Product |
|---|---|---|
| 14 | N-propylacetamide. | 1-(propylamino)adamantane. |
| 15 | N-ethylacetamide. | 1-(ethylamino)adamantane. |
| 16 | N-butylacetamide. | 1-(butylamino)adamantane. |
| 17 | N-isopropylacetamide. | 1-(isopropylamino)adamantane. |
| 18 | N-methoxypropylacetamide. | 1-(3-methoxypropylamino)adamantane. |

In the preceding, instead of the N-substituted acetamide being used, satisfactory results are obtained using the corresponding appropriately N-substituted propionamide, butyramide, and the like.

In the other of the two step reactions referred to above, a 1-(dialkylamino)adamantane oxide trihydrate is reacted with acetic anhydride to produce the corresponding 1-(alkylamino)adamantane. This route is exemplified as follows:

EXAMPLE 19

1-(dimethylamino)adamantane oxide trihydrate (1.52 grams, 0.0050 mole) and 5 milliliters (5.0 grams, 0.050 mole) of acetic anhydride was stirred together in an ice bath. The mixture is allowed to warm to room temperature and finally heated on a steam bath, whereupon the mixture becomes dark. The product is taken up in ether, which is washed with 10% sodium hydroxide and with water, dried with anhydrous potassium carbonate and evaporated. The infrared spectrum of the crude product shows absorption bands characteristic of 1-N-methylacetamidoadamantane.

Chromatography of the product with 2% ethanol in benzene on neutral alumina (Woelm, Activity—Grade I) gives 0.25 gram (24%) of crystals after recrystallization from heptane, M.P. 116–117° C. The infrared spectrum is identical with that of an authentic sample of 1-N-methylacetamidoadamantane.

This last-mentioned compound is converted as in Example 13 to 1-(methylamino)adamantane.

The 1-(dimethylamino)adamantane oxide trihydrate has the following structure

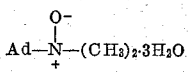

and can be readily prepared, for example, from 1-(dimethylamino)adamantane prepared as in Example 30 below, as follows:

1 - (dimethylamino)adamantane, 17.9 grams, (0.1 mole), 0.16 mole of 30% hydrogen peroxide and 20 milliliters of methanol are mixed and allowed to stand for 2 days. Decomposition of the excess peroxides by stirring with a smaller amount of palladium black, followed by filtration, evaporation and crystallization from toluene gives 14.2 grams (73%) yield of 1-(dimethylamino)adamantane oxide trihydrate crystals. After a recrystallization from toluene the crystals are allowed to dry overnight at 80° C. under oil pump vacuum.

Analysis.—Calc'd for $C_{12}H_1NO \cdot 3 \cdot H_2O$: C, 61.35; H, 10.89; N, 5.95. Found: C, 61.48; H, 10.46; N, 6.14.

The (alkylamino)adamantanes described herein can be readily converted to their salts by known techniques as illustrated by the following:

EXAMPLE 20

1-(methylamino)adamantane prepared as in Example 13 is treated by passing anhydrous HCl into an ether solution of the amine. The resulting hydrochloride is dissolved in hot acetonitrile with the aid of a little methanol. The hydrochloride salt crystallizes from the cooled solution as gray crystals, M.P. 226° C. (temperature gradient block), yield 11.1 grams (79%). For analysis, a portion is recrystallized once from ethanol and once from acetonitrile-methanol and then is dried at 100° C. for 24 hours under oil pump vacuum, M.P. 250–251° C.

Analysis.—Calc'd for $C_{11}H_{20}NCl$: C, 65.48; H, 9.99; N, 6.94. Found: C, 65.57; H, 9.98; N, 7.11.

The compound of this example shows excellent activity in standard tissue culture tests against influenza A (swine) and influenza A–2 (Jap 305, JPC, Michigan A/AA), and excellent in vivo activity in mice against influenza A (swine) and influenza A–2 (Michigan A/AA).

In another useful and advantageous process for preparing compounds of this invention, a 1-N-alkylacetamido-adamantane, conveniently prepared as described above, can be reduced with LiAlH$_4$ according to the following:

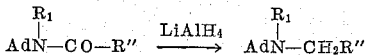

The reaction takes place in a suitable solvent such as diethylene glycol dimethyl ether at elevated temperatures. This is illustrated by the following:

EXAMPLE 21

A 250-milliliter flask with reflux condenser, drying tube and stirrer is charged with 19.3 grams (0.10 mole) of 1-acetamidoadamantane, 100 milliliters of diethyleneglycol dimethyl ether, and 5.7 grams (0.15 mole) of lithium aluminum hydride. The mixture is heated in an oil bath for 8 hours at 60° C. and finally for 2 hours at 120° C. After cooling, the reaction mixture is treated with water to decompose the excess LiAlH$_4$. The insoluble aluminum compounds are dissolved by adding a 20% solution of sodium potassium tartrate. The organic base is extracted with ether. The ether solution is dried with anhydrous potassium carbonate, filtered and evaporated. The residue is dissolved in 120 milliliters of 1N hydrochloric acid and 10 milliliters of 70% perchloric acid is added. The product is cooled in the refrigerator and the crystals are filtered off and dried to give 19.7 grams (70%) of the perchlorate salt of 1-(ethylamino)adamantane, M.P. 285–290° C. (with decomposition).

The free base is regenerated with 60 milliliters of 10% sodium hydroxide. The base is extracted with ether and the ether is dried with anhydrous potassium carbonate, filtered and evaporated. Distillation of the oily residue gives 8.96 grams (50% over all) of a colorless liquid, B.P. 101–102.5° C. (7.0 mm.), which solidifies at room temperature to a low melting solid. The nuclear magnetic resonance spectrum shows the features of the ethyl group and a single N-H proton.

Analysis.—Calc'd for $C_{12}H_{21}N$: C, 80.38; H, 11.81. Found: C, 80.39; H, 11.67.

The compound of this Example is notable for its activity in vivo in mice against influenza A (swine) and influenza A–2 (Michigan A/AA).

Other N-alkylaminoadamantanes of this invention can of course be prepared by the procedure of this Example. Illustrative are the propyl and butyl substituted-amino adamantanes.

EXAMPLE 22

A 100-milliliter, 3-necked round-bottom flask with magnetic stirrer, reflux condenser, drying tube, dropping funnel and thermometer is charged with 0.10 mole of 1-bromo-adamantane and 0.40 to 0.50 mole of propionitrile. Then 10 milliliters (18 grams, 0.18 mole) of concentrated sulfuric acid is dropped in. The mixture is warmed to 50° C. for 2 hours, then poured into 200 milliliters of ice-water. The mixture is extracted with dichloromethane. The extract is washed with water, dried with anhydrous magnesium sulfate, and evaporated. The residue is recrystallized from acetonitrile and is 1-propionamidoadamantane, M.P. 102.5–104.5° C.

A 200-milliliter round-bottom flask with magnetic stirrer, heating mantle, reflux condenser and drying tube is dried by flaming under a current of nitrogen, cooled, and charged with 100 milliliters of diethyleneglycol dimethyl ether ("diglyme," distilled from sodium) and 0.10 mole of LiAlH$_4$. Then 0.050 mole of the 1-propionamidoadamantane is added cautiously and the mixture is refluxed for two hours. The reaction mixture is cooled to room temperature and the excess LiAlH$_4$ is destroyed by adding water dropwise. The product is distributed between ether and 10% sodium hydroxide solution. The ether extract is dried with anhydrous potassium carbonate and is evaporated. The residue is distilled to obtain 53% yield of 1-(propylamino)adamantane, B.P. 95–98° C./6 mm., $n_D^{25}$ 1.4980. This compound is converted as in Example 20 to the hydrochloride salt, M.P. 342° C. (with decomposition).

This latter compound has in vivo activity against influenza A (swine) and influenza A–2 (Michigan A/AA).

EXAMPLE 23

Example 22 is repeated except that butyronitrile is used in place of the propionitrile and the resulting 1-butyramidoadamantane, M.P. 119.1–120.0° C., is recrystallized from ethyl acetate. This amide is used according to that example to obtain a 24% yield of 1-(butylamino)adamantane, B.P. 126–128° C./6 mm. which is converted to its hydrochloride salt.

This latter compound has in vitro activity against influenza A–2 (Michigan A/AA).

EXAMPLE 24

1-(ethylamino)adamantane (17.9 grams, 0.10 mole), prepared as in Example 21, is refluxed with 20 milliliters of acetic anhydride for 1 hour. The product is cooled and dissolved in 200 milliliters of ether, and is stirred with 200 milliliters of 10% sodium hydroxide. The ether solution is washed with saturated potassium carbonate solution and is dried with anhydrous potassium carbonate. The ether is evaporated and the residue is recrystallized from cold hexane and then from acetonitrile to give 15.3 grams (69%) of 1-(N-ethylacetamido)adamantane, M.P. 94.0–95.5° C. This amide is used according to the procedures of Example 22 to obtain a 53% yield of 1-(diethylamino)adamantane, B.P. 64° C./0.02 mm., $n_D^{25}$ 1.5032, which is converted to the hydrochloride salt, M.P. 248° C. (with decomposition).

This latter compound shows significant activity against Semliki forest virus, influenza A (swine), influenza A–2 (Michigan A/AA), and influenza B (Lee/40).

EXAMPLE 25

A flask equipped with a Dean-Stark water-separator is charged with 15.1 grams (0.10 mole) of 1-aminoadamantane, 15.4 grams (0.10 mole) of freshly distilled benzaldehyde, and 50 milliliters of toluene. The solution is allowed to reflux for 45 hours. The toluene is evaporated and the residue is recrystallized from 100 milliliters of methanol (cooled in Dry Ice) to give 20.1 grams (84%) of 1-benzylidineaminoadamantane, M.P. 58.4–60.0° C. For analysis, a portion is sublimed at 100° C. (0.25 mm.). The infrared spectrum shows C=N absorption at 6.09 microns.

*Analysis.*—Calc'd for $C_{17}H_{21}N$: C, 85.30; H, 8.85. Found: C, 84.93; H, 8.79.

This latter compound shows activity against swine, WSN, Jap 305 and Michigan A/AA influenzas.

Following the procedure of Example 25, other aldehydes and ketones can be reacted with 1-aminoadamantane to give the corresponding Schiff base as illustrated by the following:

| Example No. | Carbonyl Compound | Product |
| --- | --- | --- |
| 26 | Acetophenone | 1-(methylbenzylideneamino)adamantane. |
| 27 | Acetaldehyde | 1-(ethylideneamino)adamantane. |
| 28 | Propionaldehyde | 1-(propylideneamino)adamantane. |

EXAMPLE 29

A 250-milliliter flask is charged with 15.1 grams (0.1 mole) of 1-aminoadamantane, 40 milliliters (91 grams, 0.64 mole) of methyl iodide, 25.2 grams (0.3 mole) of sodium bicarbonate, and 150 milliliters of methanol. The mixture is stirred magnetically and refluxed overnight. The insoluble material is filtered off and the filtrate is evaporated to dryness. The residue is extracted repeatedly with hot chloroform, which is filtered and evaporated to give 31.1 grams (97%) of crude 1-adamantyltrimethylammonium iodide. For analysis a portion is recrystallized twice from water and dried at 80° C. under oil pump vacuum, M.P. 313° C. (sealed, evacuated capillary).

*Analysis.*—Calc'd for $C_{13}H_{24}NI$: C, 48.60; H, 7.53. Found: C, 49.15; H, 8.14.

This compound has in vivo activity against swine influenza and in vitro activity against Jap 305 and Michigan A/AA influenzas.

A 50-milliliter flask equipped with a reflux condenser and a magnetic stirrer is charged with 12.8 grams (0.040 mole) of 1-adamantyltrimethylammonium iodide and 25 grams (0.40 mole) of 2-aminoethanol. The mixture is brought to reflux and is refluxed for 15 minutes. The cooled product is poured into 100 milliliters of water. The mixture is extracted with ether, which is dried with anhydrous potassium carbonate and evaporated. The infrared spectrum of the oily residue shows no OH or $NH_2$ bands, indicating that the oil is free of aminoethanol. Weak bands at 3.75 and 9.08 microns are indicative of the adamantane skeleton. The free base is converted to the perchlorate salt by dissolving it in 1N HCl and adding perchloric acid. From the cooled mixture is obtained 8.2 grams (73%) of white crystals of 1-(dimethylamino)adamantane perchlorate, M.P. 180–184° C. For analysis the perchlorate is recrystallized three times from water and is dried at 100° C. at the oil pump.

*Analysis.*—Calc'd for $C_{12}H_{22}ClNO_4$: C, 51.51; H, 7.93. Found: C, 51.59; H, 8.03.

The free base is regenerated and recovered by the procedures of Example 21. The hydrochloride is formed by HCl addition to the free base and is found to sublime at 250° C. (sealed, evacuated capillary).

The perchlorate of this example shows excellent activity against Jap 305, Michigan A/AA and vaccinia in tissue culture tests and against swine influenza in mice. The hydrochloride product of this example has activity against swine and Michigan A/AA influenzas in both tissue culture and mouse tests, and additionally shows therapeutic and prophylactic effects on influenza B (Lee/40) in mice.

A preferred process for preparing 1-(dimethylamino)-admantane and 1-(N-alkyl-N-methylamino)adamantanes is illustrated by the following:

EXAMPLE 30

A 50-milliliter round-bottom flask is charged with 6.90 grams (0.15 mole) of 98% formic acid and 12.1 grams (0.15 mole) of 37% formalin solution. Then, 7.56 grams (0.05 mole) of 1-aminoadamantane is charged, a condenser is attached, and the mixture is heated at 90° C. on a steam bath for 16 hours. Gas is evolved during the heat-up period, and for some time thereafter. After cooling, the mixture is transferred to a separatory funnel with 50 milliliters of water, 25 milliliters of 50% sodium hydroxide is added, and the mixture is extracted with three 25-milliliter portions of ether. The ether extracts are combined, washed with 50 milliliters of 12.5% sodium hydroxide, dried with potassium hydroxide pellets, and concentrated in a vacuum to yield 8.17 grams of 1-(dimethylamino)adamantane as a colorless, mobile liquid. This is distilled, B.P. 80° C. at 2.0 mm. The infrared spectra of the crude and distilled materials are qualitatively identical with that of a sample of this compound made by pyrolysis of 1-adamantyltrimethylammonium iodide. (See Example 29.)

Application of this procedure to 0.05 mole of 1-(butylamino)adamantane yields 1-(N-butyl-N-methylamino)-adamantane. Likewise its application to 1-(isopropylamino)-adamantane yields 1-(N-isopropyl-N-methylamino)adamantane, and to 1-(methylamino)adamantane yields 1-(dimethylmino)-adamantane.

EXAMPLE 31

A 140-milliliter stainless steel bomb is charged with 1-aminoadamantane (15.1 grams, 0.10 mole), ethylene oxide (5.0 grams, 0.11 mole) of water and 40 milliliters of tetrahydrofuran, and heated at 70° C. for 12 hours. The product is evaporated and distilled to give in one run 0.44 gram of material boiling at 122–124° C. and 0.04 mm. and 8.96 grams of material boiling at 152° C. at 0.04 mm. Due to variations in the measurement of ethylene oxide, the proportions of products may vary from run to run. On occasion, practically no yield of monoadduct is found but on other occasions the yield of this product is high. Recrystallization of the lower boiling fraction from toluene gives 1-(2-hydroxyethylamino)-adamantane, M.P. 97–99° C.

*Analysis.*—Calc'd for $C_{12}H_{21}NO$: C, 73.80; H, 10.85; N, 7.17. Found: C, 73.19; H, 10.75; N, 6.89.

This latter compound shows in vivo activity against influenza A (swine) and influenza A–2 (Michigan A/AA).

Recrystallization of the higher boiling fraction from acetonitrile gives 1-[bis(2-hydroxyethyl)amino]adamantane, M.P. 115.4–116.4° C.

*Analysis.*—Calc'd for $C_{14}H_{25}NO_2$: C, 70.25; H, 10.53; N, 5.85. Found: C, 70.52; H, 10.55; N, 5.81.

The cyclicaminoadamantanes of this invention of Formulas 1 and 6 above where $n$ equals 4, 5 or 6 can be prepared by first reacting 1-bromoadamantane with the required cyclic amide in the presence of silver sulfate to give a cyclicamidoadamantane which in turn is then reduced with lithium aluminum hydride to give the cyclicaminoadamantane This is illustrated by the following:

EXAMPLE 32

A mixture of 43 parts by weight of 1-bromoadamantane, 60 parts by weight of pyrrolidine-2-one, and 62 parts by weight of silver sulfate is stirred in a reaction vessel and heated gently. When the temperature reaches 60° C., an exothermic reaction occurs and the temperature rapidly rises to 110° C. in spite of cold water-bath cooling. (Caution: Special cooling techniques should be used when this reaction is carried out on a large scale.) When the temperature subsides to 94° C., the mixture is stirred and heated to maintain this temperature for two hours. The resulting mixture is filtered hot, and the filtrate is poured into 800 parts by weight of water The resulting precipitate is removed by filtration and dried over calcium chloride under reduced pressure. The product, 1-(1-adamantyl)pyrrolidine-2-one, weighs 36 parts by weight and melts 75–85° C. A sample is purified for analysis by repeated recrystallization from water, M.P. 99.6–100.4° C.

Under anhydrous conditions, a stirred solution of 19.2 parts by weight of 1-(1-adamantyl)pyrrolidine-2-one in 100 parts by weight of diethyleneglycol, dimethyl ether (diglyme) is treated with 5 parts by weight of lithium aluminum hydride portionwise over 20 minutes at 32° C. (external cooling is required). After the addition, the temperature is maintained at 40° C. until the exothermic reaction subsides. Then the mixture is heated at 55° C. for 18 hours, followed by cooling and decomposition of any unreacted lithium aluminum hydride with aqueous diglyme. The reaction mixture is poured into a dilute, aqueous solution of potassium sodium tartrate, and the mixture is extracted with ether. The ether phase is isolated, washed with aqueous base, dried, and stripped under reduced pressure to give a residue of essentially pure 1-(1-pyrrolidinyl)adamantane.

This is taken up in a solution of 20 milliliters of concentrated hydrochloric acid in 200 milliliters of water. The solution is washed with 50 milliliters of ether, and then concentrated in a vacuum to crystals, which are dried by heating at 50° C and. 0.05 mm. for 1 hour. The crystalline mass is ground with 50 milliliters of ether, the crystals are filtered and dried in a vacuum at 60° C. The yield is 14.7 grams of 1-(1-pyrrolidinyl)adamantane hydrochloride.

*Analysis.*—Calc'd for $C_{14}H_{24}ClN$: N, 5.79; Neutral. Equiv. 242. Found: N, 5.70; Neutral. Equiv. 246.

Activity is noted against influenza A (swine) and influenza A–2 (Jap 305 and Michigan A/AA).

EXAMPLE 33

N-(1-adamantyl)caprolactam, M.P. 106.2–108.0° C. is prepared by the procedure of Example 32, starting with caprolactam instead of pyrrolidine-2-one. Lithium aluminum hydride reduction gives 1-(1-hexamethyleneiminyl)adamantane, B.P. 125° C. at 1 mm., which solidifies on cooling, M.P. 50.5–52.4° C. Treatment with hydrochloric acid as above yields 1-(1-hexamethyleneiminyl)-adamantane hydrochloride.

*Analysis.*—Calc'd for $C_{16}H_{28}ClN$: C, 71.21; H, 10.46; N, 5.19. Found: C, 71.05; H, 10.47; N, 5.20.

Activity is noted against pseudorabies virus.

EXAMPLE 34

The compound of Formulas 1 and 6 above where $n$ is 3 is identified as 1-(1-azetidinyl)adamantane and is synthesized from 1-(1-adamantyl)azetidine-2-one according to the method of the second paragraph of Example 32. The 1-(1-adamantyl)azetidine-2-one is obtained from the reaction of 1-aminoadamantane and acrylonitrile, followed by hydrolysis and ring closure of the resulting N-(1-adamantyl)beta-alanine with thionyl chloride.

Additional examples are as follows:

EXAMPLE 35

A 100-milliliter three-necked flask with paddle stirrer, dropping funnel, reflux condenser and ice bath is charged with 4.30 grams of 1-bromoadamantane and 20 milliliters of liquid hydrogen cyanide. Then 4 milliliters of sulfuric acid is dropped in and the mixture is stirred for 4 hours. The excess HCN is allowed to evaporate into a trap for separate disposal. Water is added cautiously to the reaction flask. The precipitate is filtered off and washed with water. After drying, the precipitate is chromotographed on silicic acid with chloroform as the eluent. The main fraction is recrystallized once from methanol to give crystals of 1-formamidoadamantane, M.P. 139.0–140.1° C.

*Analysis.*—Calc'd for $C_{11}H_{17}NO$: C, 73.69; H, 9.56; N, 7.82. Found: C, 73.45; H, 9.55; N, 8.05, 7.89.

This compound shows excellent tissue culture activity against influenza A (swine), influenza A–2 (JPC and Michigan A/AA, and arborvirus (Semliki forest). Additionally, the compound of this example shows activity in mice against influenza A (swine).

EXAMPLE 36

A sample of 1-aminoadamantane (5 grams) and 2.7 milliliters (a slight excess) of liquid bromine is shaken with 100 milliliters of water. A golden yellow solid forms. Filtration gives 8 grams of crude yellow solid which is recrystallized from chloroform. This gives a first crop of 3.4 grams of golden crystals of N-bromo-1-aminoadamantane hydrobromide, M.P. 217° C. in a sealed capillary (with decomposition). The compound liberates iodine from potassium iodide and is readily decolorized by reducing agents in general.

*Analysis.*—Calc'd for $C_{10}H_{17}NBr_2$: C, 38.70; H, 5.51; N, 4.51; Br, 51.30. Found: C, 38.83; H, 6.11; N, 4.60; Br 50.68.

The compound of this example shows activity against pseudorabies and a variety of influenza strains (swine, Michigan A/AA, Sendai).

EXAMPLE 37

A 100-milliliter flask with magnetic stirrer and reflux condenser is charged with 7.55 grams (0.050 mole) of 1-aminoadamantane, 6.13 grams (0.050 mole) of ethyl chloroacetate, 5.00 grams (0.060 mole) of sodium bicarbonate, and 20 milliliters of methanol. The mixture is refluxed overnight. The insoluble material is filtered off, the filtrate evaporated to dryness, the residue is dissolved in 60 milliliters of 1 N HCl, and 10 milliliters of 70% perchloric acid is added. The precipitated perchlorate salt of 1-N-adamantylglycine ethyl ester is filtered off, washed with cold water, and dried to give 8.3 grams (49%) of white crystals decomposing over a wide range at about 155° C.

The free base is regenerated with 10% sodium hydroxide. After extraction with ether and evaporation, the oily product is distilled to give 1.58 grams (9%) of liquid N-(1-adamantyl)glycine ethyl ester, B.P. 85–89° C./0.23 mm., $n_D^{25}$ 1.5032.

*Analysis.*—Calc'd for $C_{14}H_{23}NO_2$: C, 70.85; H, 9.77; N, 5.91. Found: C, 70.04; H, 9.36; N, 6.44.

Activity is noted against Michigan A/AA and swine influenza viruses.

EXAMPLE 38

The hydrochloride of 1-(2-hydroxyethylamino)adamantane is prepared by bubbling anhydrous HCl into an ether solution of the amine. The salt (2.31 grams, 0.010 mole) and chlorosulfonic acid (3.84 grams, 0.033 mole) are heated in a flask protected from moisture on a steam bath with occasional mixing and stirring for 2 hours. The product is poured onto 100–150 grams of ice. Potassium hydroxide (9.0 grams, 0.16 mole) is added and the mixture is warmed until solution is complete. The mixture is steam distilled. The distillate is saturated with potassium carbonate and extracted with ether. The ether solution is dried with anhydrous potassium carbonate and is evaporated. The residue is distilled to give 0.45 gram (25%) of colorless N-(1-adamantyl)aziridine, B.P. 60.5° C. (0.09 mm.).

*Analysis.*—Calc'd for $C_{12}H_{19}N$: C, 81.29; H, 10.80; N, 7.91. Found: C, 81.26; H, 10.91; N, 8.22.

Activity is observed in mice against Michigan A/AA influenza.

EXAMPLE 39

A solution of 18.00 grams (0.10 mole) of D-glucose in 36 milliliters of warm water is added to a solution of 45.2 grams (0.30 mole) of 1-aminoadamantane in 685 milliliters of absolute ethanol. The solution is filtered through a Celite (diatomaceous earth) pad to free it from turbidity, and then it is allowed to stand at room temperature for one week. The crystals which separate are filtered, washed with a little ether, and air dried. The yield of 1,1-bis-(1-adamantylamino)-1-deoxy-D-glucose is 24.98 grams of colorless large needles, M.P. 129.5–133.0° C. (with decomposition).

*Analysis.*—Calc'd for $C_{26}H_{44}N_2O_5$: C, 67.21; H, 9.55; N, 6.03. Found: C, 67.05; H, 9.48; N, 6.03.

This latter compound is illustrative of products of this type which are within the purview of the present invention and readily obtainable with glucose and other sugars. The compound of this example shows activity against swine, JPC and Michigan A/AA influenzas.

The compounds of Formulas 1 and 6 can be administered to a warm blooded animal in accordance with this invention by any convenient route, including orally, parenterally, that is subcutaneously, intravenously, intramuscularly, or intraperitoneally. Administration can also be by vapor or spray through the mouth or nasal passages.

The dosage administered will be dependent upon the age, health and weight of the recipient, kind of concurrent treatment if any, frequency of treatment, and the nature of the effect desired. Generally, a daily dosage of active ingredient compound will be from about 1 to 200 milligrams per kilogram of body weight, although lower, such as 0.5 milligram, or higher amounts can be used. Ordinarily, from 1 to 50 preferably 1 to 20 milligrams per kilogram per day, in one or more applications per day, is effective to obtain the desired result.

The active ingredient of Formulas 1 and 6 can be employed in useful compositions according to the present invention in such dosage forms as tablets, capsules, powder packets, or liquid solutions, suspensions, or elixirs, for oral administration, or liquid solutions for parenteral use, and in certain cases, suspensions for parenteral use (except intravenous since, of course, intravenous suspensions of any material are hazardous). In such compositions the active ingredient will ordinarily always be present in an amount of at least 0.0001% by weight based on the total weight of the composition and not more than 99% by weight.

Besides the active ingredient of Formulas 1 and 6 the composition will contain a solid or liquid non-toxic pharmaceutical carrier for the active ingredient. Mixtures with one or more pharmaceutically active materials can of course be used.

In one embodiment of a pharmaceutical composition of this invention, the solid carrier is a capsule which can be of the ordinary gelatin type. In another embodiment, the active ingredient is tableted with or without adjuvants. In yet another embodiment, the active ingredient is put into powder packets. In these capsules, tablets and powders the pharmacetutical carrier will generally constitute from about 5% to about 95% and preferably from 25% to 90% by weight. These dosage forms preferably contain from about 5 to 500 milligrams of active ingredient, with from about 25 to 250 most preferred.

The pharmaceutical carrier can, as previously indicated, be a sterile liquid such as water and oils, including oils of petroleum, animal, vegetable or synthetic origin, for example peanut oil, soybean oil, mineral oil, cod liver oil, and the like. In general, water, saline and aqueous dextrose (glucose) and related sugar solutions are preferred liquid carriers, particularly for injectible solutions. Sterile injectible solutions will ordinarily contain from about 0.5 to 25%, and preferably about 5 to 10%, by weight of the active ingredient.

As mentioned above, oral administration can be in a suitable suspension or syrup, in which the active ingredient ordinarily will constitute from about 0.5 to 10%, and preferably about 2 to 5%, by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, a well known reference text in this field.

In addition to the exemplary illustrations above, the following examples further explain the present invention.

EXAMPLE 40

A large number of unit capsules for oral administration are prepared by filling standard two-piece hard gelatin capsules weighing about 50 milligrams each with 50 milligrams of powdered 1-aminoadamantane hydrochloride.

EXAMPLE 41

Example 40 is repeated except that soft gelatin capsules are used and each also containing about 25 milligrams of stearic acid.

EXAMPLE 42

Example 40 is repeated except that the dosage unit is 50 milligrams of active ingredient, 2.5 milligrams of gelatin, 2.5 milligrams of magnesium stearate and 100 milligrams of starch, mixed and formed into a tablet by a conventional tableting machine. Slow release pills or tablets can also be used.

EXAMPLE 43

A parenteral composition suitable for administration by injection is prepared by stirring 5% by weight of the active ingredient of Example 40 as the hydrochloride in sterile aqueous 0.9% saline.

A large variety of compositions can be made by substituting other compounds of this invention. This includes compounds that have specifically been named, but it is not limited to those compounds. The compounds will be used in the amounts indicated in accordance with procedures well known and described in the Martin and Cook text mentioned above.

Compounds of this invention are particularly effective against swine influenza. An important embodiment of this invention therefore is the control of this infection by incorporating an active ingredient compound in the diet of the affected animal. For most purposes, an amount of active compound will be used to provide from about 0.0001% to 0.1% by weight of the active compound based on the total weight of feed intake. Preferably, from 0.001% to 0.02% by weight will be used.

Novel and useful compositions are provided by this invention which comprise at least one active ingredient compound within the scope of this invention in admixture with an animal feed. Descriptions of suitable feeds can be found in the book "Feeds and Feeding" by Frank B. Morrison, published by the Morrison Publishing Company of Ithaca, New York, 1948, 21st edition. The selection of the particular feed is within the knowledge of the art and will depend of course on the animal, the economics, natural materials available, the surrounding circumstances and the nature of the effect desired, as will be readily understood.

A particularly important composition according to this feature of the invention is a concentrate, suitable for preparation and sale to a farmer or livestock grower for addition to animal feedstuffs in an appropriate amount. These concentrates ordinarily comprise about 0.5% to about 95% by weight of the active ingredient compound together with a finely divided solid, preferably flours, such as wheat flour, corn flour, soya beans flour and cottonseed flour. Depeding on the recipient animal, the solid adjuvant can be ground cereal, charcoal, fuller's earth, oyster shell and the like. Finely divided attapulgite and bentonite can be used, these latter materials also acting as solid dispersing agents.

The feed compositions, as well as the just-described concentrates, can additionally contain other components of feed concentrates or animal feeds, as will be readily understood. Other particularly important additives include proteins, carbohydrates, fats, vitamins, minerals, antibiotics, etc.

The following example will further illustrate this aspect of this invention.

EXAMPLE 44

A feed for pigs is prepared as follows:

|  | Pounds |
|---|---|
| Oat grouts | 350 |
| Yellow corn, ground | 1000 |
| Molasses | 100 |
| Soybean meal | 450 |
| Dried skim milk | 100 |
| Ground limestone | 20 |
| Dicalcium phosphate | 20 |
| Salt plus trace mineral mix | 10 |
| Standard vitamin premix | 1 |
|  | 2051 |

According to this invention a concentrate of 50% 1-aminoadamantane and 50% by weight corn flour is added to this feed, in an amount that provides 0.015% by weight of 1-aminoadamantane based on the total diet.

While various illustrations of the invention are provided above, it is to be understood that the invention is not limited by these illustrations but rather is intended to embrace all the variations and modifications coming within the scope of the appended claims.

The invention claimed is:
1. A composition comprising a compound selected from the group consisting of those of the formula

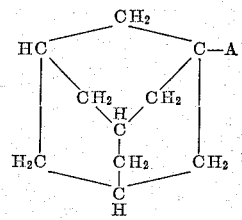

where A is selected from the group consisting of (1) 

where $R_1$ is selected from the group consisting of hydrogen; alkyl of 1 through 4 carbons; mono-substituted alkyl of 1 through 4 carbons wherein the substituent is selected from the group consisting of hydroxy, alkoxy of 1 through 3 carbons, amino, alkylamino of 1 through 2 carbons, dialkylamino where each alkyl has 1 through 2 carbons, and hydroxyalkoxyalkyl where the alkoxy portion has from 1 through 3 carbons and the alkyl portion has from 1 through 4 carbons; alkenyl of 3 through 6 carbons having at least one methylene group between the nitrogen of the group —$NR_1R_2$ and the first unsaturation of said alkenyl group; alkynyl of 3 through 6 carbons having at least one methylene group between the nitrogen of the group —$NR_1R_2$ and the first unsaturation of said alkynyl group; and $R_2$ is selected from the group consisting of hydrogen; alkyl of 1 through 4 carbons; mono-substituted alkyl of 1 through 4 carbons wherein the substituent is selected from the group consisting of chlorine, hydroxy, alkoxy of 1 through 3 carbons, amino, alkylamino of 1 through 2 carbons, dialkylamino where each alkyl has 1 through 2 carbons, and hydroxyalkyloxyalkyl where the alkoxy portion has from 1 through 3 carbons and the alkyl portion has from 1 through 4 carbons; alkenyl of 3 through 6 carbons having at least one methylene group between the nitrogen of the group —$NR_1R_2$ and the first unsaturation of said alkenyl group; alkynyl of 3 through 6 carbons having at least one methylene group between the nitrogen of the group —$NR_1R_2$ and the first unsaturation of said alkynyl group; formyl; chlorine; bromine; carboxymethyl; methoxycarbonylmethyl; and ethoxycarbonylmethyl; with —$NR_1R_2$ having a total of 12 carbons maximum;

(2) 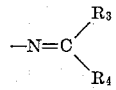

where $R_3$ is selected from the group consisting of hydrogen; alkyl of 1 through 4 carbons; and phenyl; and $R_4$ is selected from the group consisting of hydrogen and alkyl of 1 through 4 carbons;

(3) 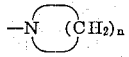

where $n$ is a positive whole number of 2 through 6;

(4) 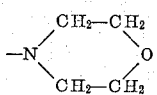

and the pharmaceutically-acceptable salts of said compounds
and from 25 to 90% of a non-toxic pharmaceutical carrier for said compound.

2. The method comprising administering to a warm-blooded animal a beneficial amount of a compound as defined in claim 1.

3. The method comprising administering a beneficial amount of 1-aminoadamantane to a warm-blooded animal.

4. The method comprising administering a beneficial amount of 1-aminoadamantane hydrochloride to a warm-blooded animal.

5. The method comprising administering a beneficial amount of 1-aminoadamantane acetate to a warm-blooded animal.

6. The method comprising administering a beneficial amount of 1-aminoadamantane bicarbonate to a warm-blooded animal.

7. The method comprising administering a beneficial amount of 1-aminoadamantane salicylate to a warm-blooded animal.

8. The method comprising administering a beneficial amount of 1-aminoadamantane salt with caprochlorone to a warm-blooded animal.

9. The method comprising administering a beneficial amount of 1-aminoadamantane salt with penicillin to a warm-blooded animal.

10. The method comprising administering a beneficial amount of 1-(methylamino)adamantane to a warm-blooded animal.

11. The method comprising administering a beneficial amount of 1-(methylamino)adamantane hydrochloride to a warm-blooded animal.

12. The method comprising administering a beneficial amount of 1-(ethylamino)adamantane to a warm-blooded animal.

13. The method comprising administering a beneficial amount of 1-(ethylamino)adamantane hydrochloride to a warm-blooded animal.

14. The method comprising administering a beneficial amount of 1-(n-propylamino)adamantane to a warm-blooded animal.

15. The method comprising administering a beneficial amount of 1-(n-propylamino)adamantane hydrochloride to a warm-blooded animal.

16. The method comprising administering a beneficial amount of 1-(isopropylamino)adamantane to a warm-blooded animal.

17. The method comprising administering a beneficial amount of 1-(isopropylamino)adamantane hydrochloride to a warm-blooded animal.

18. The method comprising administering a beneficial amount of 1-(dimethylamino)adamantane to a warm-blooded animal.

19. The method comprising administering a beneficial amount of 1-(dimethylamino)adamantane hydrochloride to a warm-blooded animal.

20. The method comprising administering a beneficial amount of 1-diethylamino)adamantane to a warm-blooded animal.

21. The method comprising administering a beneficial amount of 1-(diethylamino)adamantane hydrochloride to a warm-blooded animal.

22. The method comprising administering a beneficial amount of 1-(N-ethyl-N-methylamino)adamantane to a warm-blooded animal.

23. The method comprising administering a beneficial amount of 1-(N-ethyl-N-methylamino)adamantane hydrochloride to a warm-blooded animal.

24. The method comprising administering a beneficial amount of 1,1-bis-(1-adamantylamino)-1-deoxy-D-glucose to a warm-blooded animal.

25. The method of controlling virus infection comprising administering to a site at which virus is to be controlled an antiviral amount of a compound as defined in claim 1.

26. An edible tablet containing a compound as defined in claim 1.

27. An edible capsule containing a compound as defined in claim 1.

28. The process comprising incorporating in an animal's diet from 0.0001% to 0.1% by weight of a compound as defined in claim 1, based on the total weight of the animal's feed.

29. An animal feed comprising an animal feedstuff and a compound as defined in claim 1.

30. A feed concentrate comprising from 0.5% to 95% by weight of a compound as defined in claim 1 and an edible finely divided solid in admixture with said compound.

References Cited by the Applicant

H. Stetter et al.: "Uber Verbindungen Mit Urotropin-Strucktur, XVI Beritrage zur Chemie der Adamantyl-(1)-Derivative," Chem. Ber. 93 (1960), pp. 226–230.

ELBERT. L. ROBERTS, *Primary Examiner.*

RICHARD L. HUFF, *Assistant Examiner.*

UNITED STATES PATENT OFFICE
CERTIFICATE OF CORRECTION

Patent No. 3,310,469                  March 21, 1967

Marvin Paulshock et al.

It is hereby certified that error appears in the above numbered patent requiring correction and that the said Letters Patent should read as corrected below.

Column 18, lines 8 and 9, for "hydroxyalkyloxyalkyl" read -- hydroxyalkoxyalkyl --.

Signed and sealed this 7th day of November 1967.

(SEAL)
Attest:

Edward M. Fletcher, Jr.
Attesting Officer

EDWARD J. BRENNER
Commissioner of Patents